(12) United States Patent
Paraillous et al.

(10) Patent No.: US 11,078,114 B2
(45) Date of Patent: Aug. 3, 2021

(54) METHOD FOR TREATING VITREOUS MATERIALS BY THERMAL POLING

(71) Applicant: Centre national de la recherche scientifique, Paris (FR)

(72) Inventors: Maxime Paraillous, Talence (SE);
Thierry Cardinal, Salles (FR);
Angeline Poulon, Arsac (FR); Evelyne Fargin, Gradignan (FR); Marc Dussauze, Pessac (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 175 days.

(21) Appl. No.: 15/774,814

(22) PCT Filed: Nov. 8, 2016

(86) PCT No.: PCT/FR2016/052884
§ 371 (c)(1),
(2) Date: May 9, 2018

(87) PCT Pub. No.: WO2017/081396
PCT Pub. Date: May 18, 2017

(65) Prior Publication Data
US 2018/0327306 A1 Nov. 15, 2018

(30) Foreign Application Priority Data
Nov. 10, 2015 (FR) ..................... 15 60733

(51) Int. Cl.
*C03C 23/00* (2006.01)
*C03C 21/00* (2006.01)
(Continued)

(52) U.S. Cl.
CPC ............ *C03C 23/009* (2013.01); *C03C 3/087* (2013.01); *C03C 3/111* (2013.01); *C03C 21/007* (2013.01)

(58) Field of Classification Search
CPC .......................... C03C 21/007; C03C 23/009
See application file for complete search history.

(56) References Cited

U.S. PATENT DOCUMENTS

| 3,811,855 A | 5/1974 | Carlson et al. |
| 4,824,458 A | 4/1989 | Ettori et al. |
| (Continued) |

FOREIGN PATENT DOCUMENTS

| JP | 1974-073413 | 7/1974 |
| JP | 1987-230653 | 9/1987 |
| WO | WO-2015093284 | 6/2015 |

OTHER PUBLICATIONS

Deriano S et al: "Mechanical strength improvement of a soda-lime-silica glass by thermal treatment under flowing gas", Journal of the European Ceramic Society, Elsevier Science Publishers, Barking, Essex, GB, vol. 24, No. 9, Aug. 1, 2004 (Aug. 1, 2004), pp. 2803-2812, XP027107171, ISSN: 0955-2219 [retrieved on Mar. 9, 2004] paragraphes 2. Experimental procedures, 3. Results, 5. Conclusion; figures 8,9,10; tables 1,2.
(Continued)

*Primary Examiner* — Erin Snelting
(74) *Attorney, Agent, or Firm* — B. Aaron Schulman, Esq.; Stites & Harbison, PLLC

(57) ABSTRACT

The invention relates to a method for treating a silicate-type glass comprising alkali and alkaline-earth metal oxides or $d^{10}$ or IIIA metal oxides, said method comprising at least the following steps: (a) incorporation of nitrogen into the surface of the glass; and (b) thermal poling treatment of the material obtained in (a), under a chemically inert controlled
(Continued)

atmosphere. The invention also relates to the material produced by said method.

13 Claims, 5 Drawing Sheets

(51) Int. Cl.
    *C03C 3/076* (2006.01)
    *C03C 3/087* (2006.01)
    *C03C 3/11* (2006.01)

(56) References Cited

U.S. PATENT DOCUMENTS

| | | | |
|---|---|---|---|
| 5,045,508 | A | 9/1991 | Brow et al. |
| 2015/0111040 | A1 | 4/2015 | Funatsu et al. |
| 2015/0329408 | A1 | 11/2015 | Bookbinder et al. |
| 2016/0340226 | A1* | 11/2016 | Dutta .............. C03C 3/083 |
| 2018/0237334 | A1* | 8/2018 | Hijiya .............. C03C 3/078 |

OTHER PUBLICATIONS

Marc Dussauze et al: "How Does Thermal Poling Affect the Structure of Soda-Lime Glass?", Journal of Physical Chemistry C, vol. 114, No. 29, Jul. 29, 2010 (Jul. 29, 2010), pp. 12754-12759, XP055286062, US ISSN: 1932-7447, DOI: 10.1021/jp1033905 cited in the application paragraphs 2. Experimental Details, 4. Discussion; figures 5,6.

Alexey V. Redkov et al: "How Does Thermal Poling Produce Interstitial Molecular Oxygen in Silicate Glasses?", Journal of Physical Chemistry C, vol. 119, No. 30, Jul. 30, 2015 (Jul. 30, 2015), pp. 17298-17307, XP055286072, US ISSN: 19327447, DOI: 10.1021/acs.jpcc.5b04513 abstract; paragraphe 2. Experimental Details; tables 1,2.

A. Lepicard et al: "Surface Reactivity Control of a Borosilicate Glass Using Thermal Poling", Journal of Physical Chemistry C, vol. 119, No. 40, Oct. 8, 2015 (Oct. 8, 2015), pp. 22999-23007, XP055286070, US ISSN: 1932-7447, DOI: 10.1021/acs.jpcc.5b07139 abstract; paragraphe 2.2. Poling.

Written Opinion of the International Searching Authority for PCT/FR2016/052884, dated Jan. 16, 2017.

International Search Report for PCT/FR2016/052884, dated Jan. 16, 2017.

French Search Report dated Jul. 18, 2016 in corresponding French Application No. 1560733.

PhD thesis of Tatiana Crémoux, Dec. 17, 2013.

A, V. Redkov, Journal of Non-Crystalline Solids 409 (2015) 166-169.

Audrey A. Lipovskii, Solid State Ionics, 181 (2010) 849-855.

P. N. Brunkov, Technical Physics Letters 34 (2008) 1030-1033.

\* cited by examiner

METHOD FOR TREATING VITREOUS MATERIALS BY THERMAL POLING

The present invention relates to a method for treating vitreous materials by thermal poling in order to improve the mechanical properties of the treated materials, in particular soda-lime silicate glasses. The invention also relates to the materials obtained by this method.

PRIOR ART

Soda-lime silicate glasses are widely used for the manufacture of building glazing or solar mirrors in solar concentrating plants. These glasses may be subject to difficult atmospheric conditions and must therefore be resistant to the mechanical stresses of the external environment and ensure durability of their properties over time.

Many vitreous materials are currently marketed. Various studies have been carried out with the aim of improving the mechanical properties of these materials. Ion exchange methods (replacing sodium atoms with larger potassium atoms) make it possible to bind the surface of the glass and make it harder. This is the method used to improve the surface mechanical properties of the glass of mobile phone screens. Some manufacturers use harder materials such as sapphire.

Methods for treating vitreous soda-lime silicate materials are known to improve the properties of these materials: Dussauze M., Rodriguez V. et al. How does thermal poling affect the structure of soda-lime glass?», 1. Phys. Chem. C 2010, 114, 12754-12759. This document describes thermal poling treatments under air or under argon, and studies the properties of the glasses so obtained. Similar treatments are described in Redkov A. V. et al., 1. Phys. Chem. 119 (30), 2015, 17298-17307 and Lepicard A. et al., J. Phys. Chem. 119 (40), 2015, 22999-23007. Dériano S. et al., Journal of the European Ceramic Society, 24 (2004) 28032812 discloses a method for treating soda-lime glass, wherein the method comprises thermal treatment in a gaseous flow ($N_2$, $NH_3$ or air). This method is supposed to lead to a strengthening of the mechanical properties of the glass. At the end of these treatments, the results of limited mechanical strength showed, in particular, an increase of the hardness of 7%. This document does not mention the durability of the effects of the treatment, nor the improvement of the resistance to the chemical or climatic aggressions, or to aging.

The soda-lime silicate glasses used in the various applications mentioned above are generally subjected to high mechanical or climatic stresses. It thus appears necessary to improve the surface mechanical properties (hardness, resistance to abrasion or scratches) of these vitreous materials. In particular, the materials obtained by the methods of the prior art do not make it possible to provide sufficient mechanical strength and durability for solar-type applications.

The object of the invention is to overcome the difficulties mentioned above, and to provide vitreous materials, in particular to provide soda-lime silicate type glasses, offering improved mechanical strength compared to the glasses of the prior art, in particular an improved hardness and impact resistance, while preserving the optical properties of the starting material, including the transmission of light.

SUMMARY OF THE INVENTION

The invention relates to a method for the treatment of a silicate type glass comprising alkali and alkaline earth metal oxides or $d^{10}$ or IIIA metal oxides, wherein the method comprises at least the following steps:
(a) Incorporation of nitrogen into the surface of the glass,
(b) Thermal poling treatment of the material from (a) under a chemically inert controlled atmosphere.

According to a preferred embodiment, step (a) consists of a thermal treatment of the glass at a temperature greater than or equal to 150° C. under a nitrogen-controlled atmosphere.

According to a preferred embodiment, step (a) consists of a thermal treatment of the glass under a nitrogen-controlled atmosphere, and in step (a) the temperature is from 200° C. to 500° C.

According to a preferred embodiment, step (a) consists of a thermal treatment of the glass under a nitrogen-controlled atmosphere, and in step (a) the atmosphere is essentially composed of a gas chosen from: $N_2$, $NH_3$, optionally Ar, He, wherein a mixture of these gases comprises at least $N_2$ or $NH_3$.

According to a further preferred embodiment, in step (a) the atmosphere is composed essentially of $N_2$ nitrogen, or a mixture of nitrogen and an inert gas selected from Ar and He.

According to a preferred embodiment, in step (b) the material is maintained at a temperature ranging from 150 to 500° C. and exposed to an electric field characterized by a voltage ranging from 0.1 to 10 kV.

According to a preferred embodiment, in step (b) the controlled atmosphere is essentially composed of a gas chosen from: dry air, $O_2$, $N_2$, Ar, He, a mixture of two or more of these gases.

According to a more preferred embodiment, in step (b) the controlled atmosphere is composed essentially of $N_2$ nitrogen.

According to a still more preferred embodiment, in step (b) the material is maintained at a temperature ranging from 200 to 300° C.

According to a preferred embodiment, the glass used has the following mass composition: 0 to 40% $Al_2O_3$; 50 to 97% $SiO_2$; 0 to 15% $B_2O_3$; 0 to 25% ZnO; 0 to 5% $ZrO_2$; 0 to 10% $TiO_2$; 0 to 40% $Na_2O$; 0 to 40% $Li_2O$; 0 to 40% $K_2O$; 0 to 40% MgO; 0 to 50% CaO; 0 to 40% SrO; 0 to 40% BaO; 0 to 15% $Ag_2O$; 0 to 15% $Au_2O_3$; $Au_2O$; 0 to 15% $Cu_2O$, and at least 95% by weight of the components, relative to the total weight of the glass, are chosen from: $Al_2O_3$; $SiO_2$; $B_2O_3$; ZnO; $ZrO_2$; $TiO_2$; $Na_2O$; $Li_2O$; $K_2O$; MgO; CaO; SrO; BaO; $Ag_2O$; $Au_2O_3$; $Au_2O$; $Cu_2O$.

According to a preferred embodiment, the glass used is a glass of the following composition, defined in % by weight: from 60 to 74% of $SiO_2$, 8.2 to 16.4% of $Na_2O$, 3.2 to 7.40% of CaO, 2.8 to 4.30% of MgO, 0.3 to 1.20% of $Al_2O_3$, 0.3 to 1.20% of $K_2O$ and 0.1 to 0.30% of $SO_3$.

The invention further relates to a material obtainable by the method defined above, which is a poled transparent glass and comprises a nitrogen content greater than or equal to 0.1%.

According to a preferred embodiment, the composition of the glass obtained is as follows, in % by weight of 60 to 74% of $SiO_2$, 8.2 to 16.4% of $Na_2O_3$, 3.2 to 7.40% of CaO, 2.8 to 4.30% of MgO, 0.3 to 1.20% of $Al_2O_3$, 0.3 to 1.20% of $K_2O$, 0.1 to 0.30% of $SO_3$ and 0.1% to 5% of nitrogen.

The invention further relates to the use of the method for:
improving the durability of a glazing, or
improving the scratch resistance of a digital/tactile screen, or
increasing the resistance to abrasion of a mirror.

It also relates to the use of the method for manufacturing:
building glazing, or
a solar panel mirror, or
a screen for electronic devices, or
a fiberglass.

The invention makes it possible to precisely control the surface chemistry and the mechanical properties of vitreous materials, in particular of soda-lime silicate type materials. It improves the mechanical performance of glasses, in particular soda-lime silicate glasses, which are known for their use in a wide range of applications.

The invention makes it possible to modify the surface chemistry of glasses, in particular soda-lime silicate-type glasses, to enhance their mechanical surface performance, in particular to improve the hardness and the impact resistance while preserving their optical properties, in particular the transmission of light, which is evaluated by the measurement of transmittance. This method is applicable to glasses of all sizes.

Surprisingly, a synergistic effect was observed between the two steps of the treatment, leading to an improvement in the mechanical properties of the glass that was much higher than that to which persons skilled in the art might have expected by observing the effects of each of these steps taken separately.

In addition, it was found that the method of the invention gives the treated glasses a better resistance to aging. Tests evaluating the hardness of the glasses have shown that the hardness is maintained after a climatic/chemical aging treatment, whereas the glasses of the prior art, subjected to the same aging test, exhibit a very significant degradation of their mechanical properties.

This aging resistance was in no way predictable on reading the prior art.

DETAILED DESCRIPTION

The invention relates to the field of optical materials and the fields of application of the products of the glass industry. In a non-limiting manner, these glasses have applications in the fields of building glazing, in the manufacture of mirrors for solar energy, screens for electronic devices (tablets, portable screens . . . ), optical fibers.

Starting Materials:

The glasses used are of the silicate type. They advantageously comprise oxides of alkali and alkaline earth metals or oxides of metals $d^{10}$ and IIIA, such as, for example, oxides of Na, Li, K, Mg, Ca, Sr, Ba and Al. In particular, the invention relates to sodium-calcium silicates.

The glasses used as starting materials advantageously have the following mass composition:

0 to 40% $Al_2O_3$
50 to 97% $SiO_2$
0 to 15% $B_2O_3$
0 to 25% ZnO
0% to 5% $ZrO_2$
0 to 10% $TiO_2$
0 to 40% $Na_2O_3$
0 to 40% $Li_2O$
0 to 40% $K_2O$
0 to 40% MgO
0 to 50% CaO
0 to 40% SrO
0 to 40% BaO
0 to 15% $Ag_2O$
0 to 15% $Au_2O_3$, $Au_2O$
0 to 15% $Cu_2O$

Advantageously, at least 95% by weight of the components, relative to the total mass of the glass, are chosen from: $Al_2O_3$; $SiO_2$; $B_2O_3$; ZnO; $ZrO_2$; $TiO_2$; $Na_2O_3$; $Li_2O$; $K_2O$; MgO; CaO; SrO; BaO; $Ag_2O$; $Au_2O_3$, $Au_2O$; $Cu_2O$.

Other species not mentioned in the above list may represent up to 5% by weight relative to the total weight of the glass.

Advantageously, the glasses of the invention comprise from 50 to 97% by weight of $SiO_2$ and from 3 to 50% by weight of components chosen from alkali and alkaline earth metal oxides and metal oxides of $d^{10}$ and IIIA.

According to a preferred variant, the glasses of the invention comprise from 55 to 80% of $SiO_2$ and from 20 to 45% by weight of components chosen from alkali and alkaline earth metal oxides, wherein it is understood that other species may represent up to 5% by weight relative to the total weight of the glass.

Their composition is advantageously defined in % by weight: from 60 to 74% of $SiO_2$, 8.2 to 16.4% of $Na_2O_3$, 3.2 to 7.40% of CaO, 2.8 to 4.30% of MgO, 0.3 to 1.20% of $Al_2O_3$, 0.3 to 1.20% of $K_2O$ and 0.1 to 0.30% of $SO_3$, wherein it is understood that other species not mentioned in this list may represent up to 5% by weight relative to the total weight of the glass.

Preferably, their composition is defined in % by weight: from 60 to 74% of $SiO_2$, 8.2 to 16.4% of $Na_2O$, 3.2 to 7.40% of CaO, 2.8 to 4.30% of MgO, 0.3 to 1.20% of $Al_2O_3$, 0.3 to 1.20% $K_2O$ and 0.1 to 0.30% of $SO_3$, and at least 98%, more preferably at least 99%, by weight of the components, based on the total weight of the glass, are part of the group consisting of $SiO_2$, $Na_2O_3$, CaO, MgO, $Al_2O_3$, $K_2O$ and $SO_3$.

Generally, the starting material is of substantially homogeneous composition.

The invention consists of a method comprising at least two steps which are applied to the starting material described above.

Treatment Method:

Step (a):

Step (a) consists of the incorporation of nitrogen at the surface or surface area of the glass. According to the invention, an introduction of nitrogen in a surface area means that after treatment, nitrogen is essentially present in the 100 nm to 1 micron thick glass surface area. The nitrogen atoms are introduced into the glass surface area by one of the following means:

According to a first variant, the surface of the glass may be bombarded with a nitrogen ion beam. For this, we may, for example, use an ionic bombardment.

According to a second, preferred variant of the invention, step (a) consists of a thermal treatment of the glass under a nitrogen-controlled atmosphere.

A first thermal treatment is carried out at temperatures greater than or equal to 150° C. but lower than the glass transition temperature of glass, i.e. 575° C. Preferably, the heat treatment is carried out at temperatures greater than or equal to 200° C. and less than or equal to 550° C. Even more preferably, the treatment is carried out at a temperature ranging from 250 to 450° C.

To carry out this thermal treatment, the material is placed under a controlled nitrogen atmosphere. By nitrogen-controlled atmosphere is meant an atmosphere composed of gases chosen from: $N_2$, $NH_3$, and, optionally, chemically inert gases, preferably an atmosphere composed essentially of a gas chosen from: $N_2$, $NH_3$ and, optionally, Ar, He, or a mixture of these gases comprising at least $N_2$, $NH_3$.

By "composed essentially of" is meant that at least 98% by volume of the environment of the glass is composed of the gas or gases chosen, more preferably at least 99%, preferably substantially 100%.

Preferably, the atmosphere comprises less than 1% of reactive gases such as water vapor ($H_2O$) or oxygen ($O_2$). Advantageously, it comprises less than 500 ppm of reactive gases such as water vapor or oxygen, more preferably less than 200 ppm and preferably less than 100 ppm.

Preferably, the heat treatment is carried out under an atmosphere consisting essentially of nitrogen ($N_2$) or a mixture of nitrogen and an inert gas such as Ar or He.

The thermal treatment is carried out in a closed enclosure to allow control of the atmosphere. This closed enclosure may be an oven or an autoclave. It may be a thermally insulated enclosure and provided with a hot plate. Alternatively, the thermal treatment may be performed by means of a laser beam.

The duration of the thermal treatment under controlled atmosphere must be sufficient to allow incorporation of nitrogen atoms in the glass surface. According to the means used, it is designed to cause an increase in the temperature of the glass. For example, if a laser is used to heat the glass, the target temperature is reached almost instantaneously and the treatment may be of the order of one minute. If an autoclave-type heating chamber is used for example, the treatment must last long enough for the surface of the glass to reach the desired temperature, in which case the duration of the treatment may be of the order of an hour, for example at least one hour, preferably 5 to 50 hours, more preferably 10 to 40 hours.

The thermal treatment may be applied to the entire material or only a part of the material, by means of a particular laser which can create a temperature rise over a defined area.

After treatment, the material is brought back to room temperature, always in a controlled atmosphere.

At the end of step (a), the material obtained may be stored, without particular precautions, especially in the open air, before its implementation in step (b).

The method of the invention gives access to a glass loaded with nitrogen atoms in the surface area. Nitride glasses, comprising nitrogen distributed substantially uniformly in the mass of the glass, are known in the prior art, but these are iridescent and non-transparent, which makes it impossible to use them in the intended applications. (especially solar panels and reflectors, electronic device screens).

Step (b):

A thermal treatment assisted by an electric field is then applied to the material obtained at the end of step (a).

The second thermal poling treatment is carried out at temperatures greater than or equal to 100° C. but lower than the glass transition temperature, i.e. 575° C. Preferably, the thermal poling treatment is carried out at temperatures above or equal to 150° C. or below or equal to 500° C. Preferably the treatment is carried out at a temperature ranging from 200 to 300° C.

To carry out this second treatment, the material is placed under a controlled atmosphere. By controlled atmosphere is meant a chemically inert atmosphere under thermal poling conditions, preferably an atmosphere consisting essentially of a gas selected from: dry air, $O_2$, $N_2$, Ar, a mixture of two or more of these gases.

By "consisting essentially of" is meant that at least 98% by volume of the environment of the glass is composed of the gas or gases chosen, more preferably at least 99%, preferably substantially 100%.

Preferably, the atmosphere comprises less than 1% water vapor ($H_2O$). Advantageously, it comprises less than 500 ppm of water vapor, preferably less than 200 ppm, and more preferably less than 100 ppm.

Preferably, the thermal poling treatment is carried out under a nitrogen ($N_2$) atmosphere. According to this preferred variant, there is a greater increase in hardness.

The thermal poling treatment must also be carried out under a controlled atmosphere in a perfectly hermetic enclosure. The control of this atmosphere is one of the parameters that plays a key role in the quality of thermal poling treatment.

The glass is exposed to an electric field characterized by a voltage of 0.1 to 10 kV, more preferably 0.2 to 7 kV, most preferably 0.5 to 5 kV.

In the thermal poling method, the material is placed between two electrodes. The thermal poling method takes place in a non-reactive atmosphere, or a blocking electrode.

The electrodes may be in direct contact with the glass. It is possible to perform the same treatment without direct contact with the anode. The distance between the anode and the glass must be controlled and should be preferably less than or equal to 300 µm. The thermal poling treatment may also be performed by means of two electrodes moving without contact over the surface of the glass.

The duration of the thermal poling treatment is 1 minute to 5 hours, preferably 5 minutes to 2 hours, more preferably 20 minutes to 60 minutes.

As for step (a), the duration of the treatment of step (b) is a function of the means used to cause the temperature rise. Persons skilled in the art know how to adapt this duration as a function of the speed of access to the chosen treatment temperature.

The glass is then brought back to ambient temperature while maintaining the electric field, and always under a controlled atmosphere. Once the system has reached room temperature, the voltage is lowered to 0V. The thermal poling treatment is then completed.

The thermal treatment may be applied to the entire material or only a part of the material by means of a laser, in particular which allows the creation of a temperature rise over a defined area.

The Material Resulting from the Treatment:

This thermal poling method makes it possible to modify the surface chemistry of the material. By applying this potential difference to the glass, positively charged sodium atoms migrate to the center of the material. In order to respect the neutrality of the charges, the material will naturally, under a controlled atmosphere, reform Si—O—Si bonds. A layer of doped silica is created at the extreme surface. This treatment makes it possible to increase the mechanical performances on the surface, in particular in the case of micro-indentation and nano-indentation. The various parameters of the system (atmosphere, temperature, applied voltage, duration) make it possible to control the thickness and the chemistry of the silica layer on the surface. The method is stable over time and reproducible.

During the thermal poling method, the glass is subjected to two chemical events. The thermal treatment provides energy to the atoms, giving them a greater ability to move within the crystallographic structure of the glass. This is all the more true for the species present in the glass having high mobilities and diffusion coefficients: the alkaline species such as: $Na^+$, $Li^+$, $CaI^+$, $MgI^+$ and $K^+$. The higher the poling temperature, the greater is the mobility of these ions. Poling induced by the electric field causes the alkaline species to migrate within the material. The migration of these positively charged alkaline species leads to the creation of a layer at the extreme surface (a few hundred nanometers to a few micrometers), which is poor in alkaline species. This layer is called the depletion zone. Maintaining the potential difference during the cooling down allows the depletion zone to be retained.

In order to compensate for the departure of these positively charged species, two recombination mechanisms (also called compensation mechanisms) may occur:

The glass matrix, composed of a network of chemical bonds between the oxygen and silicon atoms can rearrange, restructure and thus form an $SiO_2$ silica layer at the extreme surface. This recombination mechanism occurs during the treatment in a reactive atmosphere and in a non-reactive atmosphere.

When the poling treatment is carried out in the presence of $H^+$ ions, especially in the presence of water, the compensation of the alkaline positive species may be performed by injection into the glass of other positively charged species present in the atmosphere and which come to take the place of the alkaline species in the crystallographic mesh and thus compensate for their departures. The $H^+$ hydrogen atoms present in the air are injected directly into the glass during the treatment and compensate for the migration of the alkaline species. This phenomenon can not take place in the case of the invention where the poling is carried out under an inert atmosphere such as argon or nitrogen because these $H^+$ species are not present.

In the method of the invention, as the poling treatment is carried out in the absence of $H^+$ ions, the restructuring of the network results in the creation of a silica $SiO_2$ layer of several hundred nanometers at the extreme surface. This experimental configuration of the thermal poling treatment is responsible for the significant improvement of the mechanical properties of the glass. Furthermore, the pre-treatment under nitrogen of the glass surface allows a significant improvement in mechanical properties.

Compared to the materials of the prior art to which only a thermal poling treatment has been applied, the materials obtained by the method of the invention are distinguished by the presence of nitrogen on the surface of the material.

The invention also relates to the materials obtainable by the method of the invention, which are characterized by their particular composition:

These are silicate type materials. They advantageously comprise oxides of alkali and alkaline earth metals or oxides of metals such as, for example, oxides of Na, Li, K, Mg, Ca, Sr, Ba, Al. In particular, the invention relates to soda-lime silicate glasses poled and comprising a nitrogen content greater than or equal to 0.1% by weight.

This nitrogen is essentially present in the 100 nm to 1 μm thick glass surface area. The materials of the prior art having simply undergone a poling treatment in a controlled atmosphere, they do not exhibit this characteristic.

Nitrogen may be present in the material as nitride or oxynitride.

The materials of the invention are advantageously transparent glasses, in the visible, UV and IR ranges.

Transparency within the meaning of the present invention means a transmission greater than 80% between 350 nm and 2500 nm.

The materials of the invention are advantageously chosen from those whose composition is defined by:

0 to 40% $Al_2O_3$
50 to 97% $SiO_2$
0 to 15% $B_2O_3$
0 to 25% ZnO
0 to 5% $ZrO_2$
0 to 10% $TiO_2$
0 to 40% $Na_2O_3$
0 to 40% $Li_2O$
0 to 40% $K_2O$
0 to 40% MgO
0 to 50% CaO
0 to 40% SrO
0 to 40% BaO
0 to 15% $Ag_2O$
0 to 15% $Au_2O_3$, $Au_2O$
0 to 15% $Cu_2O$
0.1 to 5% nitrogen.

Advantageously, at least 95% by weight of the components, relative to the total mass of the glass, are chosen from: $Al_2O_3$; $SiO_2$; $B_2O_3$; ZnO; $ZrO_2$; $TiO_2$; $Na_2O$; $Li_2O$; $K_2O$; MgO; CaO; SrO; BaO; $Ag_2O$; $Au_2O_3$, $Au_2O$; $Cu_2O$; nitrogen.

Other species not mentioned in the above list may represent up to 5% by weight relative to the total weight of the glass.

Advantageously, the glasses of the invention comprise from 50 to 97% by weight of $SiO_2$, from 3 to 50% by weight of components selected from alkali metal and alkaline earth metal oxides, 0.1% to 5% by weight of nitrogen.

According to a preferred variant, the glasses of the invention comprise in % by weight, 55 to 80% of $SiO_2$, 20 to 45% of components chosen from alkali and alkaline earth metal oxides, and 0.1% to 5% nitrogen, wherein it is understood that other species may represent up to 5% by weight relative to the total weight of the glass.

The nitrogen may, in particular, be present in the form of nitride, for example with the creation of Si—N, Al—N bonds, or of oxynitride, for example with the creation of Si—ON, Al—ON bonds, wherein these examples are non limiting.

The composition of the material of the invention is advantageously defined, in % by weight: from 60 to 74% of $SiO_2$, 8.2 to 16.4% of $Na_2O$, 3.2 to 7.40% of CaO, 2.8 to 4.30% of MgO, 0.3 to 1.20% of $Al_2O_3$, 0.3 to 1.20% of $K_2O$ and 0.1 to 0.30% of $SO_3$ and 0.1% to 5% of nitrogen, wherein it is understood that other species not mentioned in this list may represent up to 5% % by weight relative to the total weight of the glass.

Preferably at least 98%, more preferably at least 99% by weight of the components, based on the total weight of the glass, are in the group consisting of: $SiO_2$, $Na_2O$, CaO, MgO, $Al_2O_3$, $K_2O$, $SO_3$, N.

The poling of the glass may be controlled: The most appropriate measure is the control of the depletion zone of the mobile ions. This measurement may be performed by surface chemical analysis in particular by Castaing microprobe, Auger spectroscopy or by GDOES (Glow Discharge Optical Emission Spectroscopy). It may be accompanied by a second harmonic generation measurement which makes it possible to highlight the buried electric field which is a direct consequence of the poling treatment. The analysis of second harmonic generation is described, for example, in Dussauze M., Rodriguez V. et al. How does thermal poling affect the structure of soda-lime glass?», J. Phys. Chem. C 2010, 114, 12754-12759.

The method of the invention is particularly interesting in the field of materials for optics and more generally in all fields of application of the glass industry.

For example, this invention finds application in the following fields:

Improved glazing durability,
Better scratch resistance of digital/tactile screens,
Increased resistance to abrasion of mirrors.

The invention also relates to the use of a glass as defined above, as building glazing, as a solar panel mirror, as a screen for electronic devices (tablets, laptop screens, etc.), as an optical fiber.

The invention also relates to a manufacturing method of a building glazing, a solar panel mirror, a screen for electronic devices (tablets, laptop screens, etc.), or an optical fiber, wherein this method comprises treating a glass according to the steps of the method which has been described above.

FIGURES

FIG. 1 shows a schematic representation of a thermal poling assembly

FIG. 2 shows a graph illustrating the second step of the method of the invention FIG. 3 shows a graphical representation of the evolution of Knoop hardness (ordinate) as a function of the load (abscissa in gram force gf) for a reference soda-lime glass (■), a soda-lime glass annealed under $N_2$ (•), a soda-lime glass poled thermally under $N_2$ (▲) and a soda-lime glass annealed under $N_2$ and then thermally poled under $N_2$ (▼).

FIGS. 5a and 5b show optical microscopy snapshot of surface states after climatic tests Snapshot of FIG. 5a:

|     |     |
| --- | --- |
| A1  | B1  |
| A2  | B2  |

Figure 5A:
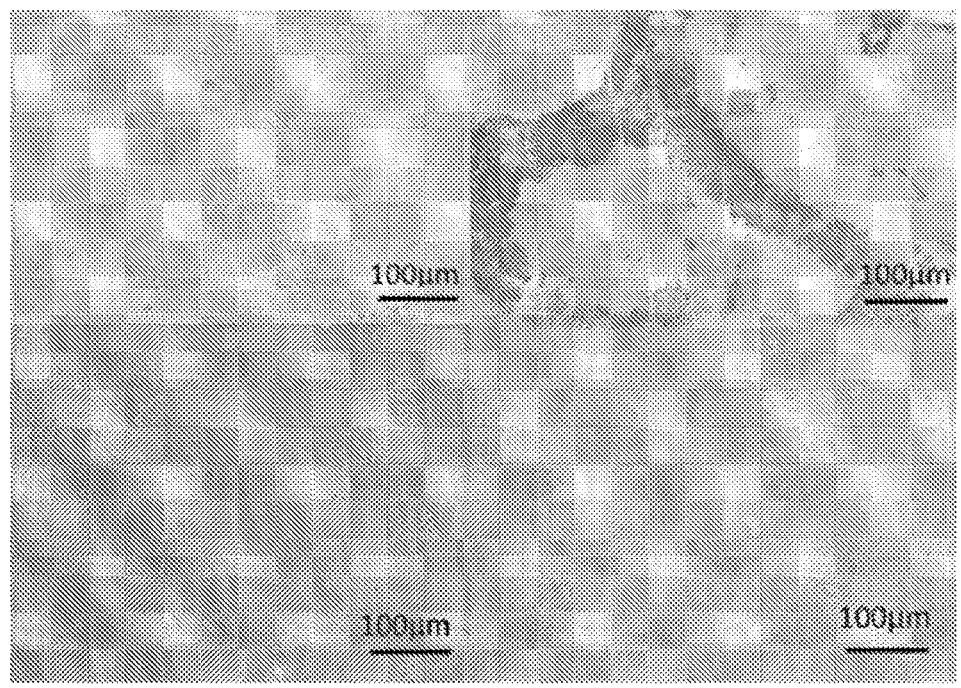
Figure 5B:
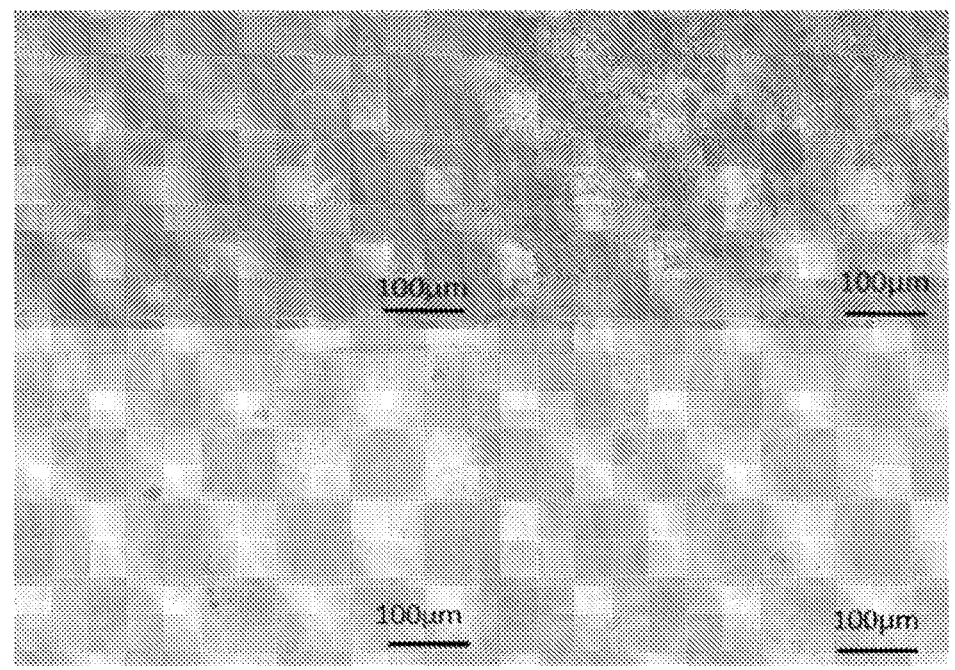

Snapshot of FIG. 5b:

|     |     |
| --- | --- |
| A3  | B3  |
| A4  | B4  |

A1: reference glass, B2: reference glass after climatic treatment; A2: annealed reference glass under $N_2$ then thermally poled under $N_2$, B2: A2 glass after climatic treatment; A3: thermally poled reference glass under air, B3: A3 glass after climatic treatment; A4: reference glass thermally poled under $N_2$, B4: A4 glass after climatic treatment.

Figure 6:
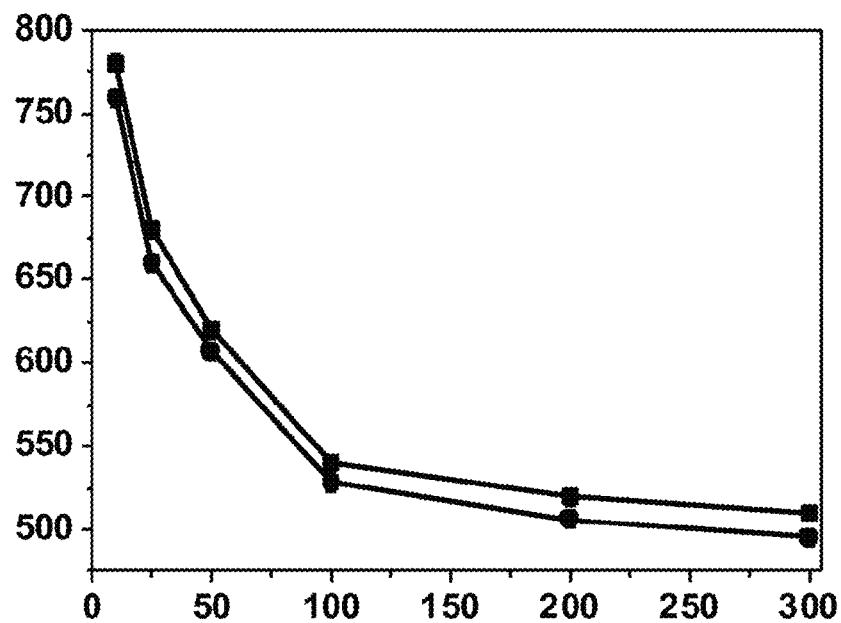

FIG. 6 shows the evolution of Knoop hardness (ordinate) as a function of the load (abscissa, in gf) of a soda-lime glass: reference glass thermally poled under $N_2$ (■); reference glass thermally poled under $N_2$ then subjected to a climatic aging cycle (•)

Figure 7:
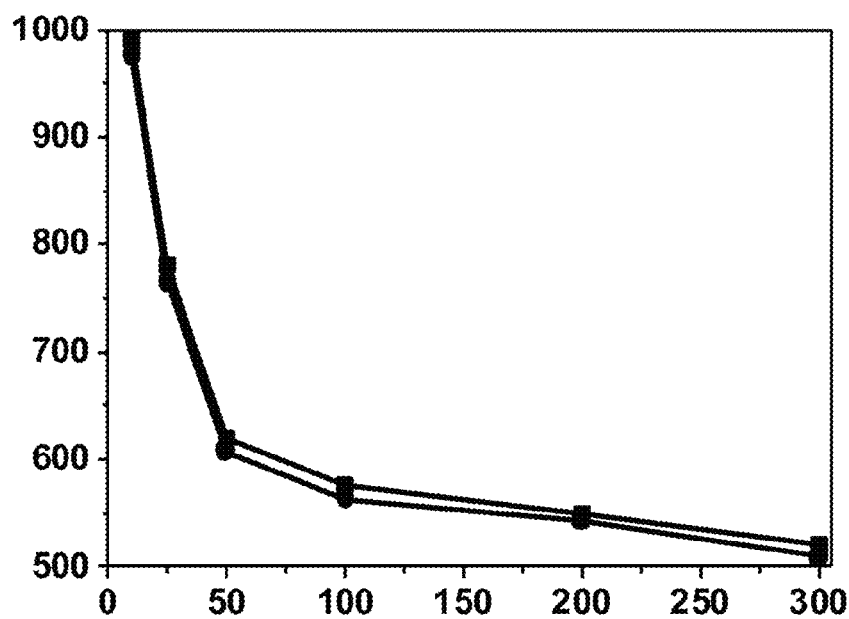

FIG. 7 shows the evolution of Knoop hardness (ordinate) as a function of the load (abscissa, in gf) of a soda-lime glass: annealed reference glass under $N_2$ then thermally poled under $N_2$ (■); reference glass annealed under $N_2$ then thermally poled under $N_2$ after climatic tests (•).

EXPERIMENTAL PART

1—Materials and Methods

1—Materials Implemented:

The glass which was used (reference soda-lime glass) is a glass available commercially from the company Menzel-Glaser. Its mass composition is as follows: 72.2% $SiO_2$, 14.3% $Na_2O$, 6.4% CaO, 4.3% MgO, 1.2% $Al_2O_3$, 1.2% $K_2O$ and 0.3% $SO_3$, wherein the % is percentages by weight.

A 1 mm thick sample (dimension of the order of 1 $cm^2$) was used.

2—Equipment:

The treatment was carried out in a chamber described below.

The thermal poling assembly is divided into three parts:

A hermetic enclosure allowing control of the atmosphere (primary vacuum, secondary, dry air, argon, nitrogen)

A heating system by contact. The heating elements are inserted in an inconel chamber which also serves as a cathode. The temperature is controlled by a thermocouple located in the inconel chamber.

A high voltage source from 0 to 15 kV.

The anode and the cathode are located face to face. The cathode is connected to a Keithley® pico-ammeter. A guard electrode on the periphery of the cathode makes it possible to collect the surface currents and to measure the current through the sample by the pico-ammeter.

3—Methods of Evaluation of the Properties of the Material:

Hardness evaluation: For nano-indentation, a Berkovich tip (NT600 nanoindenter MicroMaterials Limited) was used. For micro-indentation, a Knoop-type tip equipped with a LEICA VMHT AUTO® apparatus was used.

Chemical analysis: A GD-Profiler 2 (HORIBA Jobin Yvon®) was used to perform the chemical analysis profiles.

Evaluation of the transmittance: Cary 5000 Varian® UVNIS/NIR—XPS analysis: The XPS analyzes were carried out on a Thermo VG Scientific ESCALAB® 220 iXL spectrometer equipped with a Al KcxX monochromatic source (1486.6 eV). The samples are placed in an ultra-vacuum chamber (UHV, 109 mbar) at room temperature. The collected data are formatted with a Gaussian-Lorentzian combination for modeling. AVANTAGE® software from Thermofisher Scientific is used to process the data.

SHG: A micro-SHG coupling method was used to probe second harmonic generation. The device used is a Horiba HR800 confocal Ram/Jobin-Yvon® spectrometer with a laser source. The source used to measure the second harmonic signal is a pico-second EKSPLA® PL2200 laser emitting at a wavelength of 1064 nm.

The microscope is equipped with a motorized stage (x, y, z) that allows 3D analysis with a spatial resolution of one micron. The poled incident beam is focused on the surface of the sample by a near-infrared lens (50× or 100×). The backscattered light is captured by the same lens and redirected to the analyzer. This analyzer is used to select the analysis poling. The beam thus poled is directed to a network and then to the CCD camera which makes it possible to select the second harmonic intensity. This method makes it possible to access the localization of the electric field within the material by identifying the zone presenting the second harmonic phenomenon (ref. V. Rodriguez, D. Talaga, F. Adamietz, J L Bruneel, M. Couzi, Chem Phys Lett, 2006, 431, 190).

Climatic Aging Tests:

Analyses were carried out in climatic chambers in order to simulate different atmospheres and in order to evaluate the chemical durability and to accelerate the aging of the coatings. The method used makes it possible to evaluate the behavior of the method in real conditions of external use.

The climatic aging protocol is composed of the following phases:
1) A phase A of spraying on the glass a 1% saline solution of sodium chloride (pH 6.5 to 7.1) for a duration of 3 times 24 hours, wherein it falls on the samples at a rate of 2.0 to 4.0 ml/80 cm$^2$/hour.
2) A phase B of increasing the temperature from 25° C. to 50° C. by increasing the % humidity in the chamber from 70 to 95% for a duration of 3 times 24 hours.
3) A thermal shock phase C of −15° C. to 50° C. with a duration of 24 hours.

A complete cycle consists of the repetition of six cycles for a total duration of 6 weeks. A cycle lasts 7 days and is composed of the following sequence A-B-A-C-A-B-B.

II—Examples

The treatment carried out involves two steps: the first step is a thermal treatment of the glass under a nitrogen atmosphere. The second step is a thermal poling treatment in a controlled chemically-inert atmosphere.

1—Step (a): Thermal Treatment Under Nitrogen Atmosphere

The treatment was carried out in a mullite tube at a temperature of 400° C. under a controlled atmosphere under nitrogen ($N_2$) for 24 hours. The treatment is carried out at a temperature close to the glass transition temperature of the soda-lime glass in order to render the surface of the glass reactive to the atmosphere of the enclosure. The treatments carried out at 300° C., 350° C. and 400° C. gave the same results. The ramps of rise and fall in temperature are of the order of 15° C./minute.

The partially nitrided glass on the surface then undergoes thermal poling treatment.

2—Step (b): Thermal Poling Treatment Under a Nitrogen Atmosphere

Thermal poling treatment is a controlled thermal treatment method, assisted by an electric field. The experiment is carried out in a closed enclosure under controlled atmosphere, under closed electrode, under argon or under $N_2$. Failure to control this atmosphere (leakage, sealing problems, flow meters) may lead to undesirable chemical mechanisms that alter the mechanical properties of the glass.

Figure 1:
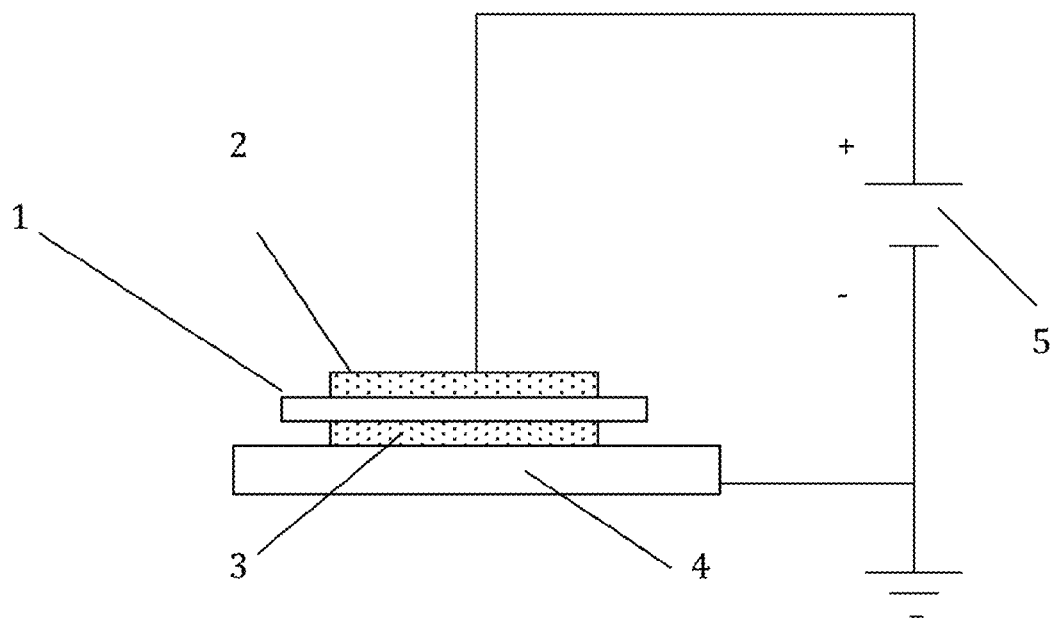

The thermal poling treatment was carried out by raising the temperature of the sample placed between two electrodes and the application of a potential difference as illustrated in FIG. 1: The glass sample 1 is placed between the anode 2 and the cathode 3, and the assembly is placed on a heating plate 4. The whole is placed in a closed chamber (not shown). The two electrodes are connected to a voltage generator 5.

The temperature is gradually raised to the temperature of thermal poling in a range of 200 to 300° C. Once the temperature is reached, a voltage in a range of 1.0 to 3.0 kV is applied. The thermal poling treatment lasts 20 to 60 minutes. The temperature is then brought back to room temperature while the voltage is still maintained at the thermal bias voltage of the experiment. Once the system reaches room temperature, the voltage is lowered to 0V. The thermal poling processing is then completed.

Figure 2:
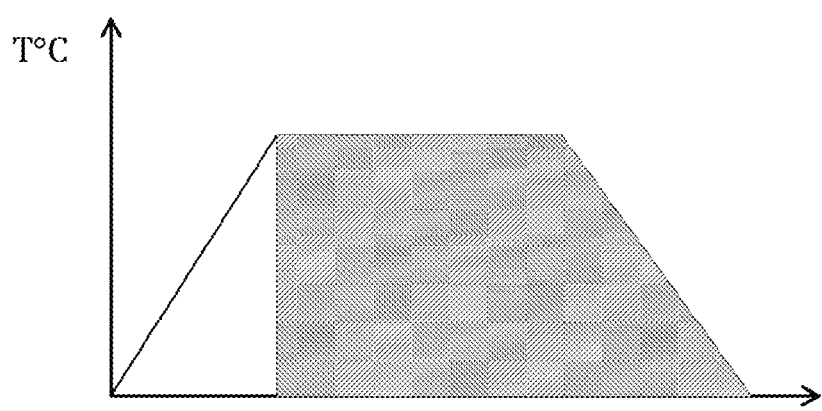

FIG. 2 graphically illustrates the second step of the method of the invention: the temperature (ordinate) is raised progressively (the time scale is represented schematically in the abscissa) to the desired threshold, then a voltage is applied, wherein this step is represented by the hatched area, finally the temperature is reduced to ambient and the voltage is reduced to 0V.

III—Characterization

Evaluation of the hardness: We compared the evolution of the Berkovich nano-indentation as a function of the load for:
Reference soda-lime glass (comparative).
A glass obtained by application to the standard soda-lime glass of the treatment described above. Step (a): Thermal treatment under nitrogen ($N_2$) (comparative).
A glass obtained by application to the standard soda-lime glass of the treatment described above. Step (b): Thermal poling treatment under a nitrogen ($N_2$) atmosphere (comparative).
A glass obtained by application to the soda-lime glass reference treatments of steps (a) annealed under $N_2$ and then (b) thermal poling under $N_2$ (according to the invention).

Figure 4:
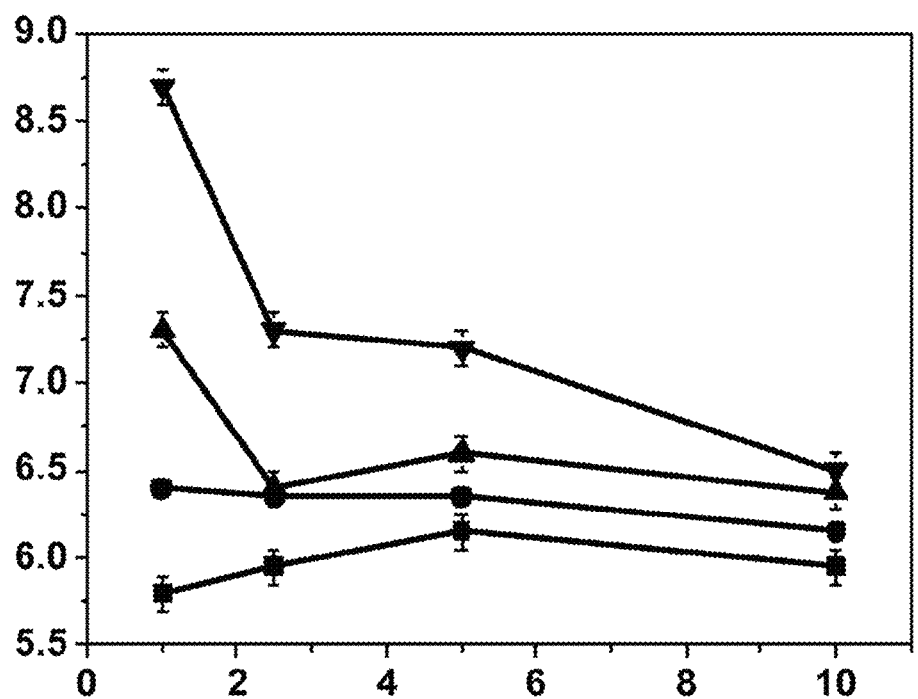
FIG. 4 shows the evolution of the Berkovich nano-indentation (ordinate in GPa) as a function of the load (abscissa in mN) for a reference soda-lime glass (■), a soda-lime glass annealed under $N_2$ (•), a soda-lime glass poled thermally under $N_2$ (▲) and a soda-lime glass annealed under $N_2$ and then thermally poled under $N_2$ (▼).

The results are illustrated in FIG. 4. For the glass of the invention, an increase in hardness of almost 40% in nanoindentation is observed for the low loads (1 and 2.5 mN).

Evaluation of the Hardness—Micro Indentation Test:

The evolution of the Knoop hardness as a function of the load was compared to:
Reference soda-lime glass (comparative).
A glass obtained by application to the standard soda-lime glass of the treatment described above. Step (a): Thermal treatment under nitrogen ($N_2$) (comparative).
A glass obtained by application to the standard soda-lime glass of the treatment described above. Step (b): Thermal poling treatment under a nitrogen ($N_2$) atmosphere (comparative).
A glass obtained by application to the reference soda-lime glass of the treatments of step (a), annealed under $N_2$ and then step (b) thermal poling under $N_2$ (according to the invention).

Figure 3:
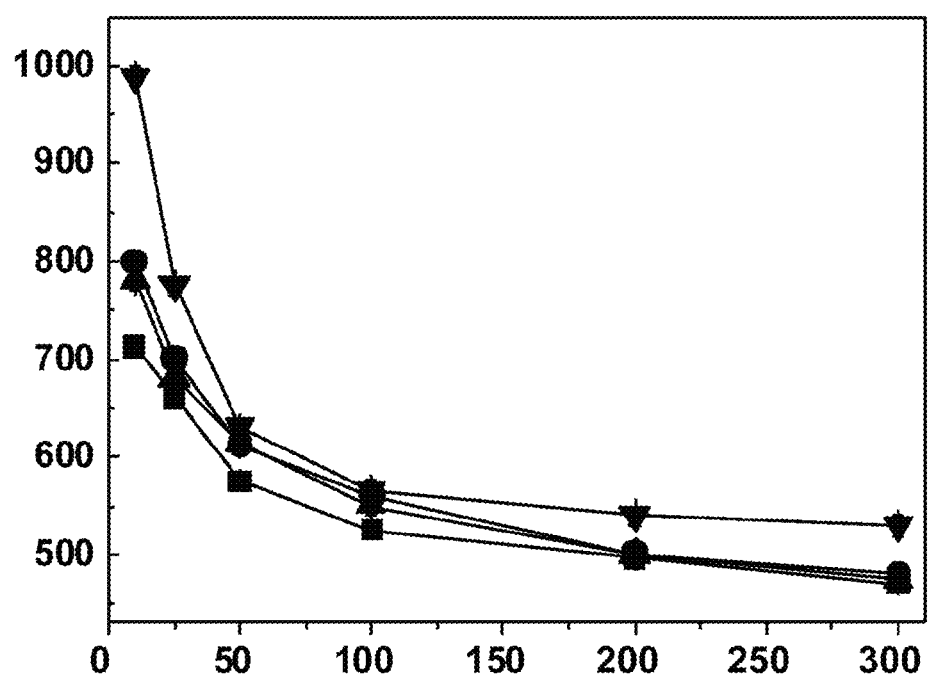

The results are illustrated in FIG. 3. For the glass of the invention, the Knoop hardness is found to be much higher than that of the reference and comparative glasses. In particular for loads ranging from 1 to 25 gf or greater than 250 gf, there is a synergistic effect of the two treatments which was by no means predictable. Only one of these respective steps makes it possible to improve the hardness of the glass by a maximum of about 20% for 10 gf. Between 50 and 200 gf, the increase is less than 13%. It is less than 5% for a load of 200 gf to 300 gf. It is the synergy of the two steps carried out successively that allows a net improvement of the hardness of nearly 40% for a load of 10 gf. The synergy of the two steps allows an increase in the hardness of more than 15% for a load between 50 gf and 300 gf.

Chemical analysis: The technique implemented, stripping coupling and spectroscopic analysis of the plasma shows a surface silica layer between 300 and 400 nm according to the experimental conditions of thermal poling. The migration of cations is observed (from several hundred nanometers for calcium and magnesium and up to several micrometers for sodium and potassium).

Evaluation of transmittance: The results are described in Table 1 below. They are expressed as percent transmittance (T) before and after climate treatment (TC).

|  | Reference glass | Air poling [1] | Poling under $N_2$ [2] | Annealing + poling under $N_2$ [3] |
|---|---|---|---|---|
| T before TC (%) | 91 | 78 | 92 | 92 |
| T after TC (%) | 86 | 71 | 91 | 91 |
| Loss of T (%) | 5.49 | 8.97 | 1.09 | 1.09 |

[1] Reference glass to which thermal poling treatment has been applied under air
[2] Reference glass to which thermal poling treatment has been applied under a nitrogen atmosphere
[3] Reference glass to which an annealing treatment was applied under a nitrogen atmosphere followed by a thermal poling treatment under a nitrogen atmosphere These analyses confirmed the preservation of the surface quality. The reference glass after climatic tests sees its transmittance greatly reduced (>5%). In the case of glass treated by thermal poling under nitrogen and in the method of the invention, the transmittance varies by 1%, which corresponds to the accuracy of the measurement.

SHG: It has been found that a poled material is obtained.

Climatic aging:

FIGS. 5a and 5b illustrate the surface state of the glasses before (series a) and after (series b) aging in climatic chambers.

Snapshots A1 and B1 illustrate the effect of thermal aging on untreated glass, i.e. a degradation of the optical qualities of the glass.

Snapshots A3/B3 and A4/B4 validate the role of atmospheric control in maintaining the optical qualities of the glass surface.

Snapshots A2 and B2 show the combined effect of annealing under $N_2$ and thermal poling under $N_2$ (according to the invention). It is found that the surface observed by optical microscopy remains unchanged. These snapshots explain the effect of the invention on the chemical durability after climate tests with respect to a soda-lime reference glass. The surface condition validates the method.

The mechanical properties of the glasses having undergone the climatic aging treatment were then evaluated.

The same micro-indentation tests (evolution of the Knoop hardness as a function of the load) were carried out following the climatic chamber tests. The results are illustrated in FIGS. 6 and 7. These tests make it possible to demonstrate the maintenance of the mechanical properties of hardness after climatic tests for the glasses which have undergone the treatment of the invention (FIG. 7). It can be seen that a poling treatment alone is not enough to keep such good hardness properties (FIG. 6).

The invention claimed is:

1. A method for treating a silicate-type glass comprising alkali and alkaline earth metal oxides or IIIA metal oxides, said method comprising:
    (a) incorporating nitrogen into a surface of the silicate-type glass whereby a material comprising nitrogen is obtained, and
    (b) thermal poling treatment of the material comprising nitrogen from (a) under a chemically inert controlled atmosphere,
    wherein the material comprising nitrogen is placed between an anode and a cathode without direct contact between the material comprising nitrogen and the anode.

2. The method according to claim 1, wherein (a) comprises a thermal treatment of the silicate-type glass at a temperature greater than or equal to 150° C. in a nitrogen-controlled atmosphere.

3. The method according to claim 2, wherein the temperature is 200° C. to 500° C. in (a).

4. The method according to claim 2, wherein in (a) the atmosphere comprises a gas selected from the group consisting of $N_2$ and $NH_3$.

5. The method according to claim 2, wherein in (a) the atmosphere comprises nitrogen $N_2$, or a mixture of nitrogen and an inert gas selected from the group consisting of Ar and He.

6. The method according to claim 1, wherein in (b) the material comprising nitrogen is maintained at a temperature ranging from 150 to 500° C. and exposed to an electric field having a voltage of 0.1 to 10 kV.

7. The method according to claim 1, wherein in (b), the controlled atmosphere consists essentially of a gas selected from the group consisting of dry air, $O_2$, $N_2$, Ar, He, and a mixture of two or more of these gases.

8. The method according to claim 7, wherein in (b) the controlled atmosphere consists essentially of $N_2$ nitrogen.

9. The method according to claim 6, wherein in (b) the material comprising nitrogen is maintained at a temperature of from 200 to 300° C.

10. The method according to claim 1, wherein the silicate-type glass has a mass composition of 0 to 40% $Al_2O_3$; 50 to 97% $SiO_2$; 0 to 15% $B_2O_3$; 0 to 25% ZnO; 0% to 5% $ZrO_2$; 0 to 10% $TiO_2$; 0 to 40% $Na_2O$; 0 to 40% $Li_2O$; 0 to 40% $K_2O$; 0 to 40% MgO; 0 to 50% CaO; 0 to 40% SrO; 0 to 40% BaO; 0 to 15% $Ag_2O$; 0 to 15% $Au_2O_3$, $Au_2O$; 0 to 15% $Cu_2O$, and at least 95% by weight of the components, relative to the total mass of the glass, that are selected from the group consisting of $Al_2O_3$; $SiO_2$; $B_2O_3$; ZnO; $ZrO_2$; $TiO_2$; $Na_2O$; $Li_2O$; $K_2O$; MgO; CaO; SrO; BaO; $Ag_2O$; $Au_2O_3$; $Au_2O$; and $Cu_2O$.

11. The method according to claim 1, wherein the silicate-type glass used is a glass of the composition, defined in % by mass, of from 60 to 74% of $SiO_2$, 8.2 to 16.4% of $Na_2O$, 3.2 to 7.40% CaO, 2.8 to 4.30% MgO, 0.3 to 1.20% $Al_2O_3$, 0.3 to 1.20% $K_2O$ and 0.1 to 0.30% $SO_3$.

12. A method for
    improving durability of glazing of a silicate-type glass comprising alkali and alkaline earth metal oxides or IIIA metal oxides; or
    improving scratch resistance of a digital/tactile screen comprising alkali and alkaline earth metal oxides or IIIA metal oxides; or
    increasing resistance to abrasion of a mirror comprising alkali and alkaline earth metal oxides or IIIA metal oxides;
    said method comprising:
    (a) incorporating nitrogen into a surface of the silicate-type glass whereby a material comprising nitrogen is obtained, and
    (b) thermal poling treatment of the material comprising nitrogen from (a) under a chemically inert controlled atmosphere,
    wherein the material comprising nitrogen is placed between an anode and a cathode without direct contact between the material comprising nitrogen and the anode.

13. A method of manufacturing:
    a building glazing comprising a silicate-type glass comprising alkali and alkaline earth metal oxides or IIIA metal oxides; or a solar panel mirror comprising a silicate-type glass comprising alkali and alkaline earth metal oxides or IIIA metal oxides; or a screen for electronic devices comprising a silicate-type glass comprising alkali and alkaline earth metal oxides or IIIA metal oxides; or a fiberglass comprising a silicate: type glass comprising alkali and alkaline earth metal oxides or IIIA metal oxides;

said method comprising:

(a) incorporating nitrogen into a surface of the silicate-type glass whereby a material comprising nitrogen is obtained, and (b) thermal poling treatment of the material comprising nitrogen from (a) under a chemically inert controlled atmosphere, wherein the material comprising nitrogen is placed between an anode and a cathode without direct contact between the material comprising nitrogen and the anode.

* * * * *